D. F., J. E., J. A. & W. H. BUNCH.
VEHICLE BRAKE.
APPLICATION FILED DEC. 30, 1910.
998,671.
Patented July 25, 1911.
2 SHEETS—SHEET 1.
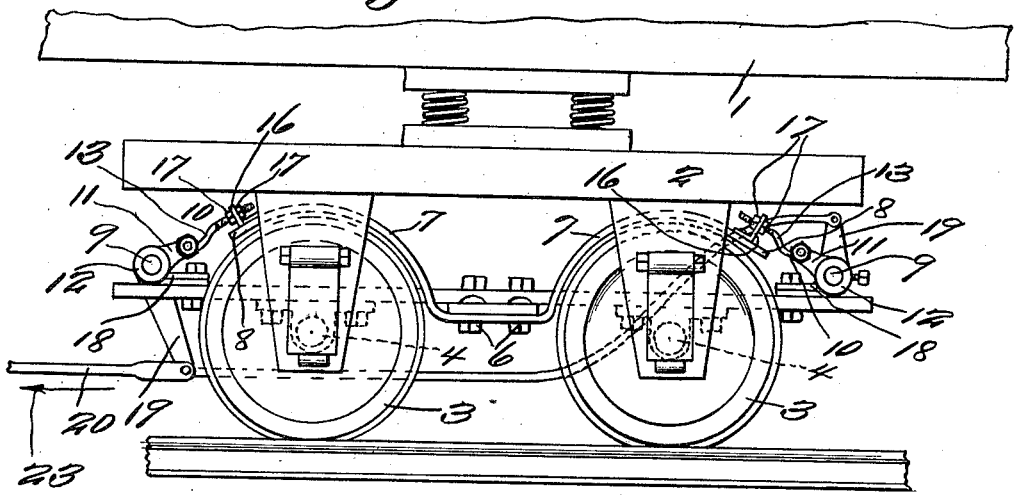
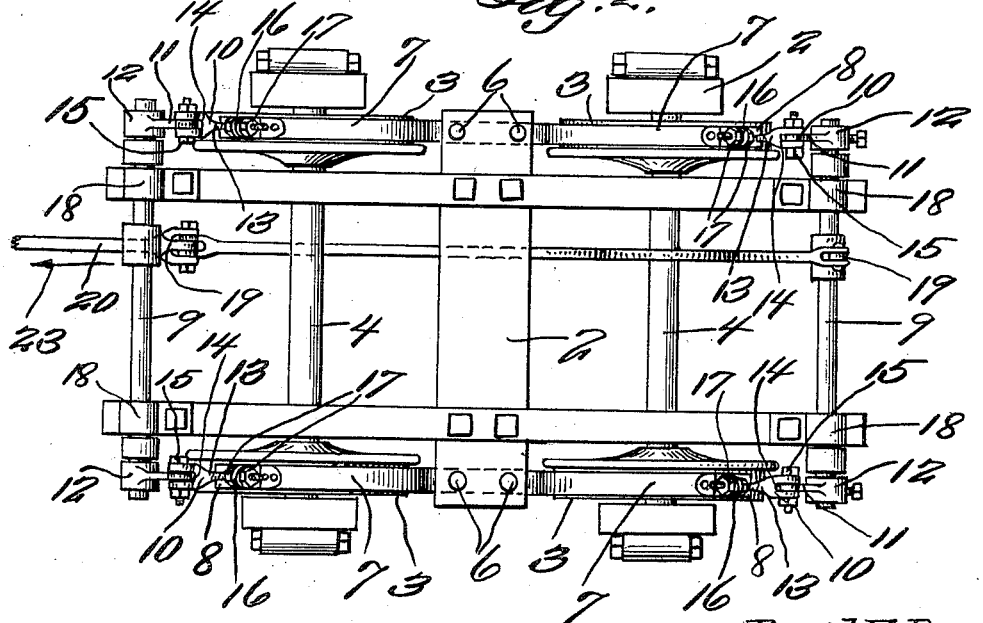

D. F., J. E., J. A. & W. H. BUNCH.
VEHICLE BRAKE.
APPLICATION FILED DEC. 30, 1910.
998,671.
Patented July 25, 1911.
2 SHEETS—SHEET 2.
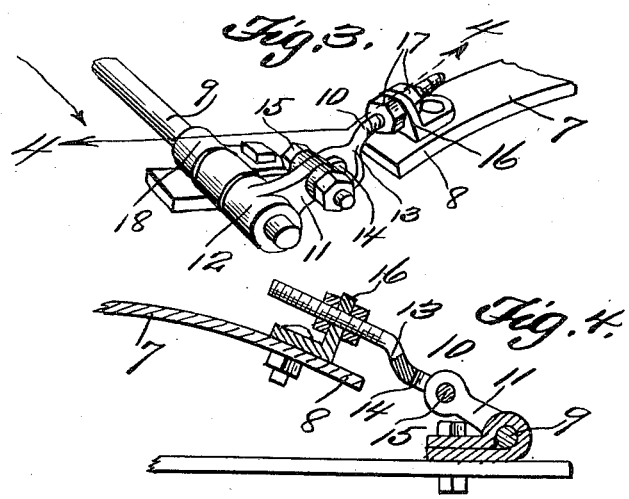
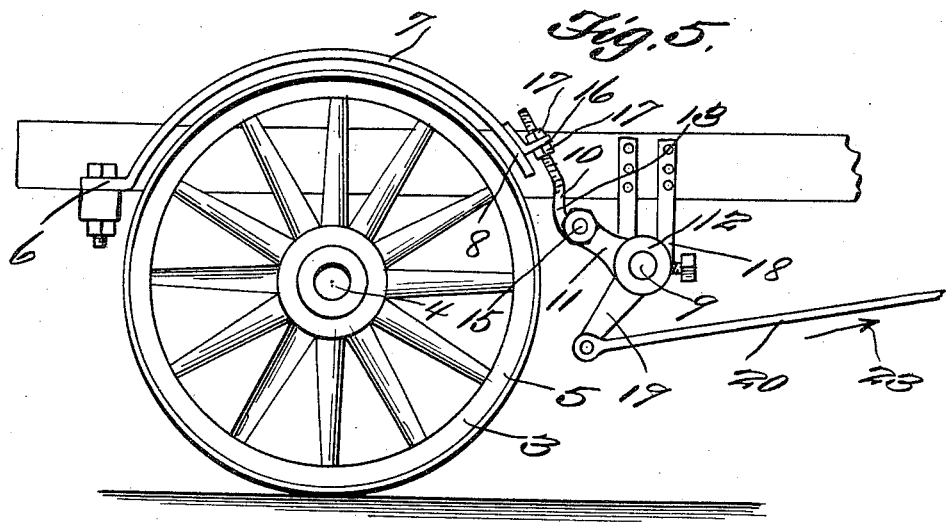

UNITED STATES PATENT OFFICE.

DAVID F. BUNCH, JULIUS E. BUNCH, JOHN A. BUNCH, AND WILLIAM H. BUNCH, OF BLALOCK, OREGON.

VEHICLE-BRAKE.

998,671.  Specification of Letters Patent.  Patented July 25, 1911.

Application filed December 30, 1910. Serial No. 600,163.

*To all whom it may concern:*

Be it known that we, DAVID F. BUNCH, JULIUS E. BUNCH, JOHN A. BUNCH, and WILLIAM H. BUNCH, citizens of the United States, residing at Blalock, in the county of Gilliam and State of Oregon, have invented a new and useful Vehicle-Brake; and we do hereby declare the following to be a full, clear, and exact description of the invention, such as will enable others skilled in the art to which it appertains to make and use the same.

Generally speaking, this invention belongs to the art of vehicles of all kinds and descriptions, and it more especially relates to a new and useful brake mechanism applicable to the frame or the running gear of the vehicle, and adapted to be applied frictionally against the circumference of the wheels of the vehicle.

The primary object of the invention is the provision of resilient steel band brake shoes having one of their ends fixed to a stationary portion of the structure of a vehicle, while their other ends are connected to a rock shaft, there being means for manipulating the shaft, whereby the band brake shoes may be applied upon the wheels.

A further object of the invention is to provide a novel connection between the free ends of the band brake shoes and the rock shaft.

In the drawings, however, it will be observed that the brake mechanism is applied to one form of vehicle, but it is to be understood that the applicant is privileged to apply it to as many different types of vehicles as possible, in order that the applicant may reap the reward to its fullest extent. Furthermore, it will be apparent that there are only two forms of the brake mechanism disclosed in the drawings, but in practical fields these forms may require alterations, to which the applicant is entitled, provided the alterations are comprehended by the appended claim.

The invention comprises further features and combination of parts which will be hereinafter more fully set forth, shown in the drawings and claimed.

In the drawings:—Figure 1 is a view in side elevation, showing a car structure including a truck and four wheels therefor, illustrating the brake mechanism as applied thereto. Fig. 2 is a plan view. Fig. 3 is an enlarged detail perspective view of the connection between one of the band brake shoes and the rock shaft. Fig. 4 is a sectional view on line 4—4 of Fig. 3. Fig. 5 is a view in side elevation of the brake mechanism as applied to a different form of vehicle, illustrating the utilization of only two wheels, and further disclosing a different form of connection between the rock shaft and the free ends of the band brake shoe.

As to the annexed drawings, 1 designates the frame of the car structure, which is supported by the truck 2 and the wheels 3. The truck 2 has extending transversely thereof and at each end the shafts or axles 4, with which the wheels 5 are revoluble. Fixed to a stationary portion of the structure of the truck as at 6 are the yieldable frictional band brake shoes 7, between the free ends 8 of which and the rock shaft 9 the connection 10 is provided. These connections 10 consist of the arms 11 of the rock shaft which are formed with sleeves 12 to fit the rock shaft, there being set screws to hold the sleeves in place upon the shaft, and the links 13, which connect with the arms and the free ends of the frictional band brake shoe. The links 13 are slotted to receive the arms, as shown at 14, there being bolts 15 passing through the links and the arms for holding them together. The ends of the links are held in place by the members 16 of the frictional band brake shoes. It will be observed, however, that the ends of the links are arranged in order to engage said members, so as to provide a secure connection between the links and the shoes. The links are further secured to the shoes by means of the nuts 17. It is apparent that by the provision of the members, the links are held in their proper relation with regards to the shoes.

The rock shaft is mounted in suitable bearings 18 of the truck and is provided with a downwardly extending arm 19, to which as shown in the drawings a rod 20 is connected, and by any suitable means (not shown) the rod 20 may be moved in the direction of the arrow 23, thus rocking the shafts 9, which in turn apply the shoes frictionally against the circumferences of the wheels. When the rod 20 is moved in the direction opposite the direction indicated by the arrow 23, the frictional contact between the shoes and the wheels is relieved, by reason of the resiliency of the shoes.

The invention having been set forth, what is claimed as new and useful is:—

In a brake mechanism, a vehicle structure, wheels therefor, resilient band brake shoes having their body portions fixed to the structure and having their free portions arching over the wheels, L-shaped plates fixed to the free portions of the shoes, links having threaded shanks passing through the L-shaped plates, nuts threaded on the shanks, one on each side of the L-shaped plates for adjustably holding the shanks thereto, said links terminating into bifurcated portions and provided with eyes, rock shafts mounted in bearings of the structure and provided with arms arranged between the bifurcated portions, bolts penetrating the eyes and the arms for securing the links and arms together, and means connecting the rock shafts whereby they may be moved in unison, to apply the band brake shoes, as set forth.

In testimony whereof we have signed our names to this specification in the presence of two subscribing witnesses.

DAVID F. BUNCH.
JULIUS E. BUNCH.
JOHN A. BUNCH.
WILLIAM H. BUNCH.

Witnesses:
J. E. BURDETT,
J. L. BLALOCK.

---

Copies of this patent may be obtained for five cents each, by addressing the "Commissioner of Patents, Washington, D. C."